(12) United States Patent
Kwon et al.

(10) Patent No.: US 9,005,845 B2
(45) Date of Patent: Apr. 14, 2015

(54) SOLID OXIDE FUEL CELL AND MANUFACTURING METHOD THEREOF

(75) Inventors: Young-Sun Kwon, Yongin-si (KR);
Jan-Dee Kim, Yongin-si (KR);
Seung-Tae Lee, Yongin-si (KR);
Jun-Won Suh, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 203 days.

(21) Appl. No.: 13/559,262

(22) Filed: Jul. 26, 2012

(65) Prior Publication Data

US 2013/0095412 A1    Apr. 18, 2013

(30) Foreign Application Priority Data

Oct. 12, 2011    (KR) .................. 10-2011-0104124

(51) Int. Cl.
*H01M 8/12*    (2006.01)
*H01M 8/02*    (2006.01)
*H01M 8/24*    (2006.01)

(52) U.S. Cl.
CPC .......... *H01M 8/0232* (2013.01); *H01M 8/1213* (2013.01); *H01M 8/1246* (2013.01); *H01M 8/243* (2013.01); *H01M 8/2465* (2013.01); *H01M 8/0206* (2013.01); *Y02E 60/521* (2013.01); *Y02E 60/525* (2013.01)

(58) Field of Classification Search
USPC ............... 429/456, 465, 454, 466, 495, 509
See application file for complete search history.

(56) References Cited

U.S. PATENT DOCUMENTS

| | | | |
|---|---|---|---|
| 4,791,035 A * | 12/1988 | Reichner | 429/456 |
| 7,645,535 B2 | 1/2010 | Rehg et al. | |
| 2007/0111069 A1* | 5/2007 | Rehg et al. | 429/32 |
| 2008/0138695 A1* | 6/2008 | Nakanishi et al. | 429/35 |
| 2008/0182147 A1* | 7/2008 | Blake et al. | 429/33 |
| 2009/0123810 A1* | 5/2009 | Devoe et al. | 429/34 |

FOREIGN PATENT DOCUMENTS

| | | |
|---|---|---|
| JP | 2005-158609 | 6/2005 |
| KR | 10-2007-0051709 | 5/2007 |
| KR | 10-0738308 B1 | 7/2007 |

* cited by examiner

*Primary Examiner* — Kenneth Douyette
(74) *Attorney, Agent, or Firm* — Christie, Parker & Hale, LLP

(57) ABSTRACT

A solid oxide fuel cell. The solid oxide fuel cell includes a unit cell, which includes a first electrode layer, an electrolyte layer, and a second electrode layer that are sequentially laminated from an inner region to an outer region of the unit cell; and an interconnector electrically connected to the first electrode layer, exposed to outside of the unit cell, and electrically insulated from the second electrode. The solid oxide fuel cell further includes a first porous current collector on an outer surface of the second electrode layer; a first adhesive layer interposed between the first porous current collector and the second electrode layer; a second porous current collector on an outer surface of the interconnector; and a second adhesive layer interposed between the second porous current collector and the interconnector.

16 Claims, 2 Drawing Sheets

SOLID OXIDE FUEL CELL AND MANUFACTURING METHOD THEREOF

CROSS-REFERENCE TO RELATED APPLICATION

This application claims priority to and the benefit of Korean Patent Application No. 10-2011-0104124, filed on Oct. 12, 2011, in the Korean Intellectual Property Office, the entire content of which is incorporated herein by reference.

BACKGROUND

1. Field

The described technology relates generally to a solid oxide fuel cell, and more particularly, to a current collector of a solid oxide fuel cell.

2. Description of Related Art

Solid oxide fuel cells may be classified as, for example, a tubular solid oxide fuel cell or a planar solid oxide fuel cell. Among these solid oxide fuel cells, the power density in a stack is slightly lower in the tubular solid oxide fuel cell than in the planar solid oxide fuel cell. However, the power densities of the entire systems of both the tubular solid oxide fuel cell and the planar solid oxide fuel cell are similar. Some benefits of the tubular solid oxide fuel cell include easy sealing between unit cells that constitute a stack, high resistance to heat stress, and high mechanical strength of the stack.

Tubular solid oxide fuel cells may be classified, for example, into a cathode-supported fuel cell using a cathode as a support, and an anode-supported fuel cell using an anode as a support. Wire made of, for example, Ag or the like may be used as a current collector, and current may be collected by using a method of winding the wire around a cathode.

When a stack is configured using a plurality of tubular fuel cells, a connection material is interposed between the cells to connect the cells to each other, the connection material having a particular thermal resistance and durability. However, the interconnector-type tubular solid oxide fuel cell has difficulty contacting the connection material because, for example, of the shape of unit cells.

SUMMARY

Embodiments of the present invention provide a solid oxide fuel cell having a current collecting structure, which can maintain thermal resistance and durability, i.e., structural stability even under a high-temperature atmosphere.

Embodiments of the present invention also provide a solid oxide fuel cell capable of maintaining structural stability and increasing current collection efficiency without blocking a chemical reaction between an anode and a cathode.

According to an aspect of the present invention, a solid oxide fuel cell includes a unit cell, a first porous current collecting member (e.g., a first porous current collector), a first adhesive layer, a second porous current collecting member (e.g., a second porous current collector), and a second adhesive layer.

The unit cell includes a first electrode layer, an electrolyte layer, and a second electrode layer that are sequentially laminated from an inner region to an outer region of the unit cell. The unit cell further includes an interconnector electrically connected to the first electrode layer, exposed to an exterior portion of the unit cell, and electrically insulated from the second electrode layer.

The first porous current collecting member is on an outer surface of the second electrode layer.

The first adhesive layer is interposed between the first porous current collecting member and the second electrode layer.

The second porous current collecting member is on an outer surface of the interconnector.

The second adhesive layer is interposed between the second porous current collecting member and the interconnector.

At least one of the first porous current collecting member or the second porous current collecting member may have a mesh shape.

The first porous current collecting member may cover substantially the entire outer peripheral (e.g., circumferential, tubular, cylindrical) surface of the second electrode layer.

The first adhesive layer and the second adhesive layer may include a metal material including at least one selected from the group consisting of silver (Ag), platinum (Pt), nickel (Ni), manganese (Mn), cesium (Ce), cobalt (Co), and combinations thereof.

The first adhesive layer and the second adhesive layer may include a ceramic material including at least one selected from the group consisting of LCCC, LSC, LSCo, LSM, LSC, $La_2O_3$, and combinations thereof.

The viscosity of the first adhesive layer and the second adhesive layer may be in a range from about 100 Pa·s. to about 300 Pa·s.

The first porous current collecting member and the second porous current collecting member may each include a metal material including at least one selected from the group consisting of silver (Ag), platinum (Pt), nickel (Ni), chromium (Cr), iron (Fe), and combinations thereof.

The first porous current collecting member and/or the second porous current collecting member may include an oxidation-resistance coating layer.

The density of the first porous current collecting member may be in a range of from about 700 Kg/m$^3$ to about 3000 kg/m$^3$.

The solid oxide fuel cell may further include a third porous current collecting member (e.g., a third porous current collector) and a third adhesive layer. The third porous current collecting member may be on an outer peripheral (e.g., circumferential, tubular, cylindrical) surface of the first porous current collecting member. The third adhesive layer may be interposed between the third porous current collecting member and the first porous current collecting member.

The third porous current collecting member may have a mesh shape.

The third porous current collecting member may have a plate shape. The third porous current collecting member may have a curved surface. The shape of the curved surface of the third porous current collecting member that comes in contact with the second electrode layer corresponds to the outer peripheral surface of the second electrode layer.

The third porous current collecting member may include a metal material including at least one selected from the group consisting of silver (Ag), platinum (Pt), nickel (Ni), chromium (Cr), iron (Fe), and combinations thereof. The third porous current collecting member may include an oxide-resistance coating layer.

According to an aspect of the present invention, a method of manufacturing a solid oxide fuel cell that includes an interconnector type-unit cell includes coating a first paste on an outer peripheral (e.g., circumferential, tubular, cylindrical) surface of an outermost electrode layer and an outer surface of an interconnector of the unit cell; placing a porous member on the coated first paste; and drying the unit cell and the porous member.

The method may further include coating a second paste on the porous member placed on the outermost electrode layer; and placing another porous member on the second coated paste on the porous member adhered to the outermost electrode layer.

In the drying of the unit cell and the porous member, the unit cell and the porous member may be dried at a temperature in the range of from about 100° C. to about 800° C.

As described above, according to embodiments of the present invention, a mesh-shaped current collecting member may be fixed to a unit cell before a stack or bundle is manufactured to improve durability at a high-temperature atmosphere and to reduce or minimize voltage drop caused by a contact failure.

Further, a mesh-shaped current collecting member may be used to improve current collection efficiency without blocking an electrochemical reaction in the unit cell.

BRIEF DESCRIPTION OF THE DRAWINGS

The accompanying drawings, together with the specification, illustrate embodiments of the present invention, and, together with the description, serve to explain the principles of the present invention.

DETAILED DESCRIPTION OF THE EMBODIMENTS

Figure 1:
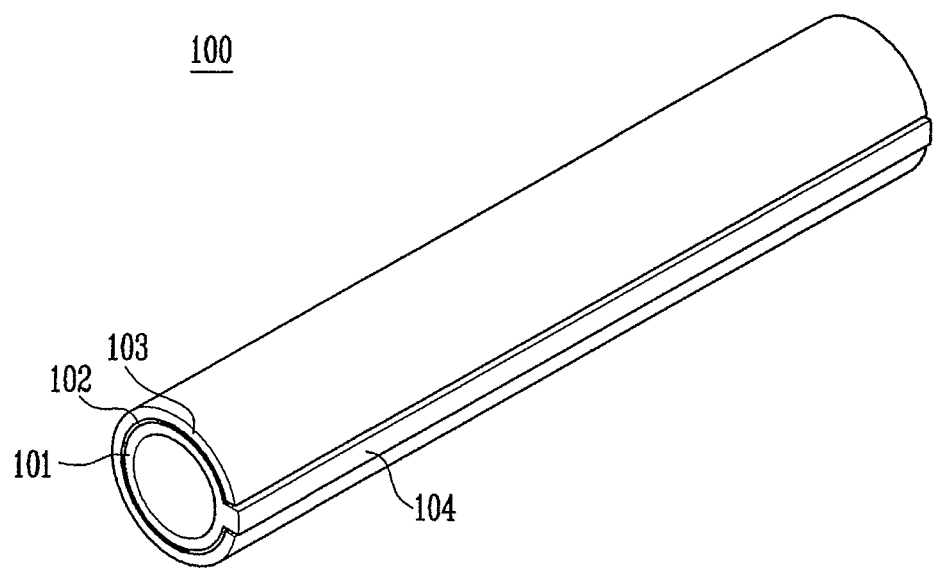
FIG. 1 is a perspective view showing an interconnector-type unit cell.

In the following detailed description, only certain embodiments of the present invention have been shown and described, simply by way of illustration. As those skilled in the art would realize, the described embodiments of the present invention may be modified in various different ways, all without departing from the spirit or scope of the present invention. Accordingly, the drawings and description are to be regarded as illustrative in nature and not restrictive. In addition, when an element is referred to as being "on" another element, it may be directly on the another element or may be indirectly on the another element with one or more intervening elements interposed therebetween. Also, when an element is referred to as being "connected to" another element, it may be directly connected to the another element or may be indirectly connected to the another element with one or more intervening elements interposed therebetween. Hereinafter, like reference numerals refer to like elements. In the drawings, the thickness or size of layers are exaggerated for clarity and not necessarily drawn to scale.

A typical fuel cell includes a fuel converter (a reformer and a reactor) for reforming and supplying fuel, and a fuel cell module. Here, the fuel cell module refers to an assembly including a fuel cell stack for converting chemical energy into electric energy and thermal energy using an electrochemical method. That is, the fuel cell module includes a fuel cell stack; a piping system through which fuel, oxide, coolant, and emissions are moved; a wire through which electricity produced by the stack is conducted; a controller for controlling or monitoring the stack; and a measuring unit for taking suitable measures when an abnormal state of the stack occurs.

An aspect of embodiments of the present invention relates to a solid oxide fuel cell having a current collecting member (e.g., a current collector). Hereinafter, embodiments of the present invention will be described with reference to the accompanying drawings.

A unit cell will be described with reference to FIG. 1. FIG. 1 is a perspective view showing an embodiment of an interconnector-type unit cell.

A unit cell 100 includes a component for receiving fuel reformed from a fuel converter (not shown) so as to produce electricity through an oxidation reaction. The unit cell 100 further includes a first electrode layer 101, an electrolyte layer 102, and a second electrode layer 103 laminated radially from a central axis of the unit cell 100; and an interconnector 104, the interconnector 104 being electrically connected to the first electrode layer 101. At least a portion of the interconnector 104 is exposed to outside of the unit cell 100. Further, the interconnector 104 is electrically insulated from the second electrode layer 103 by, for example, an insulating material interposed between the interconnector 104 and the second electrode layer 103, or by spacing the interconnector 104 apart from the second electrode layer 103. That is, the unit cell according to this embodiment may be formed as an interconnector type in terms of its current collecting method, and may be formed in a tubular shape in terms of its shape. Alternatively to the tubular shape, the unit cell 100 may also have a flat-tubular shape. Here, the flat-tubular shape refers to a flat-tubular shape having a major axis and a minor axis.

The unit cell 100 may be, for example, an anode-supported unit cell or a cathode-supported unit cell, and the present invention is not limited thereto. That is, the first and second electrode layers 101 and 103 may be an anode and a cathode, respectively, or vice versa.

The cathode may include a pure electron conductor or a mixed conductor such as a $LaMnO_3$-based or $LaCoO_3$-based material, which has high ion and electron conductivity, stability under an oxygen atmosphere, and no chemical reaction with the electrolytic layer (which will be described later). The electrolytic layer is a portion that serves as a path along which oxygen ions produced through the cathode and hydrogen ions produced through the anode (which will be described later) are moved. The electrolytic layer may be made of a ceramic material having a suitable compactness, wherein gas does not penetrate (or substantially does not penetrate) the ceramic material. The anode may be made of a ceramic material such as yttria stabilized zirconia (YSZ), and may include, for example, a metal ceramic complex (cermet) such as NiO-8YSZ or Ni-8YSZ. Here, the metal ceramic complex (cermet) typically has a relatively low price, and is stable under a high-temperature reduction atmosphere.

Figure 2:
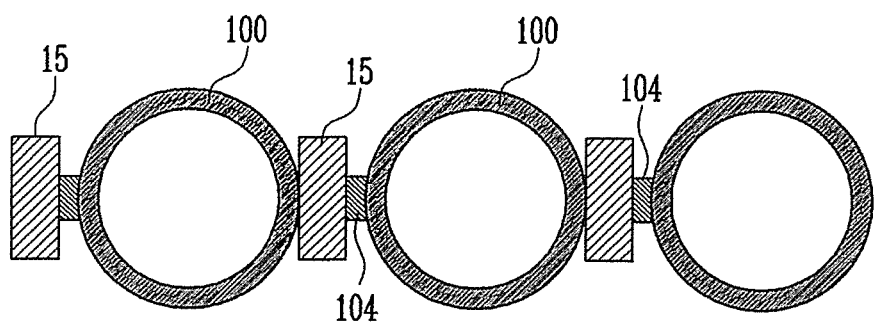
FIG. 2 is a schematic cross-sectional view showing a state that interconnector-type unit cells are connected using a current collecting member.

A case where interconnector-type unit cells are connected using current collecting members will be described with reference to FIG. 2. FIG. 2 is a schematic cross-sectional view showing interconnector-type unit cells connected using current collecting members.

In the interconnector-type unit cell 100, an interconnector 104 may act as a first electrode, and the outer peripheral (e.g., circumferential, tubular, cylindrical) surface of the unit cell 100 may act as a second electrode. When the unit cells 100 are electrically coupled in series, the interconnector 104 of one unit cell 100 becomes electrically coupled to (e.g., contacts) the outer peripheral surface of another unit cell 100.

Additionally, as shown in FIG. 2, the unit cells 100 may be electrically coupled to each other through a current collecting member interposed between the unit cells 100 so as to improve current collection efficiency. However, when the solid oxide fuel cell is driven at an operating temperature, e.g., about 800° C. or higher, the unit cells 100 and the current collecting member 15 may expand or may twist due to the heat. In this case, the contact between each of the unit cells 100 and the current collecting member 15 might not be constantly maintained, and therefore, contact resistance may increase.

Figure 3:
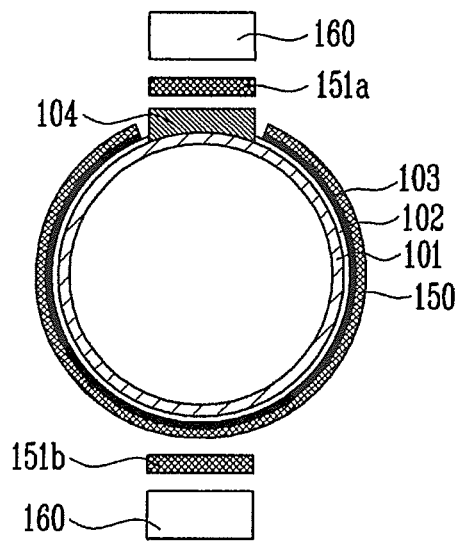
FIG. 3 is a cross-sectional view showing a solid oxide fuel cell according to an embodiment of the present invention.
Figure 4:
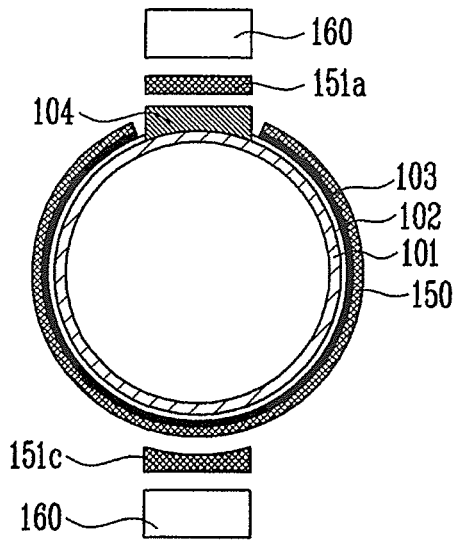
FIG. 4 is a cross-sectional view showing a solid oxide fuel cell according to another embodiment of the present invention.
Figure 5:
FIG. 5 is a cross-sectional view showing a current collecting member in a solid oxide fuel cell according to still another embodiment of the present invention.

Solid oxide fuel cells according to embodiments of the present invention will be described with reference to FIGS. 3 to 5. FIG. 3 is a cross-sectional view showing a solid oxide fuel cell according to an embodiment of the present invention. FIG. 4 is a cross-sectional view showing a solid oxide fuel cell according to another embodiment of the present invention. FIG. 5 is a cross-sectional view showing a current collecting member in a solid oxide fuel cell according to still another embodiment of the present invention.

Referring to FIGS. 3 to 5, the solid oxide fuel cell according to embodiments of the present invention includes a unit cell including a first electrode layer 101, an electrolyte layer 102, a second electrode layer 103, and an interconnector 104, each arranged substantially similar to what was previously described in relation to FIGS. 1 and 2. Additionally, the solid oxide fuel cell further includes a first porous current collecting member (e.g., the first porous current collector) 150 covering at least a portion of the outer peripheral (e.g., circumferential, tubular, cylindrical) surface of the second electrode layer 103. The first porous current collecting member 150 is electrically insulated from the interconnector 104. The first porous current collecting member 150 may have a porous shape, for example, a mesh shape, so that the outer peripheral surface of the second electrode layer 103 may better contact an oxidation fuel or oxidation agent in order to improve an electrochemical reaction that produces electricity, which is generated on the outer peripheral surface of the second electrode layer 103. Additionally, the first porous current collecting member 150 may be widely distributed on the outer peripheral surface of the second electrode layer 103 to facilitate movement of electrons and to decrease contact resistance as compared to where the first porous current collecting member 150 is not provided. That is, the first porous current collecting member 150 functions to improve current collection efficiency and increase adhesion between the second electrode layer and another current collecting member (e.g., another current collector) within the limits in which the first porous current collecting member 150 does not block the electrochemical reaction necessary for the electricity generation of the fuel cell.

In order to obtain high current collection efficiency, the first porous current collecting member 150 may be formed of a metal material including at least one selected from the group consisting of silver (Ag), platinum (Pt), nickel (Ni), chromium (Cr), iron (Fe), and combinations thereof. That is, the first porous current collecting member 150 may include a chromium-based alloy using Cr, a ferrite-based Fe—Cr alloy using Fe, a nickel-based super-alloy using Ni, in addition to precious metals such as silver and/or platinum.

While the density of the first porous current collecting member 150 may be within a broad range, in certain configurations it may be desirable for the density to be in a range from about 700 kg/m$^3$ to about 3000 kg/m$^3$ because, in such configurations, if the density of the first porous current collecting member 150 is greater than 3000 kg/m$^3$, and depending on the shape of the outer peripheral surface of the second electrode layer 103, the flexibility of the first porous current collecting member 150 may be reduced, and therefore, it may be difficult to adhere the first porous current collecting member 150 to the second electrode layer 103. As a further example, in certain configurations, if the density of the first porous current collecting member 150 is less than 700 kg/m$^3$, the fluidity of the first porous current collecting member 150 might become too large, and therefore, it may be difficult to maintain the shape of the first porous current collecting member 150 while driving the solid oxide fuel cell.

In order to improve the adhesion between the first porous current collecting member 150 and the second electrode layer 103, a first adhesive layer (not shown) may be interposed between the first porous current collecting member 150 and the second electrode layer 103.

The first adhesive layer may be formed by thinly coating a paste made of a material including a binder and a metal, which may be similar to that of the second electrode layer 103 or the first porous current collecting member 150, on a surface of the second electrode layer 103.

That is, the first adhesive layer may include a metal layer including at least one selected from the group consisting of silver (Ag), platinum (Pt), nickel (Ni), manganese (Mn), cesium (Ce), cobalt (Co), and combinations thereof; and/or a ceramic material including at least one selected from the group consisting of LCCC, LSC, LSCo, LSM, LSC, La$_2$O$_3$, and combinations thereof. After a drying operation is performed on the first adhesive layer, the binder present in the first adhesive layer is evaporated (or substantially evaporated), and substantially only materials such as the metal material or the ceramic material may remain.

The viscosity of the paste for forming the first adhesive layer may be in a range from about 100 Pa·s. to about 300 Pa·s. If the viscosity of the paste is too low, adhesion might be reduced, and if the viscosity of the paste is too high, it might be difficult to form pores, and therefore, the first adhesive layer may block the supply of the oxidation fuel or oxidation agent to the second electrode layer. In embodiments according to the present invention, it may be desirable that the paste have a viscosity of about 250 Pa·s.

Additionally, as shown in FIGS. 3 and 4, the unit cell 100 may further include a second porous current collecting member (e.g., a second porous current collector) 151a on an outer surface of the interconnector 104. The second porous current collecting member 151a may have a plate shape. The other properties of the second porous current collecting member 151a, except its shape, are substantially the same or similar to the previously described properties of the first porous current collecting member 150. For example, like the first porous current collecting member 150, the second porous current collecting member 151a may include a metal material including at least one selected from the group consisting of Ag, Pt, Ni, Cr, Fe, and combinations thereof.

In order to improve adhesion between the second porous current collecting member 151a and the interconnector 104, a second adhesive layer (not shown) may be interposed between the second porous current collecting member 151a and the interconnector 104. The second adhesive layer may be formed by coating a paste having substantially the same or similar properties as the first adhesive layer on the outer surface of the interconnector 104. As described above, the paste for forming the second adhesive layer may include a material similar to that of the interconnector 104 or the second porous current collecting member 151a, and a binder. Other properties of the second adhesive layer are substantially the same or similar to those of the previously described first adhesive layer.

Similarly, as shown in FIG. 3, the unit cell may further include a third porous current collecting member (e.g., a third porous current collector) 151b on the outer peripheral (e.g., circumferential, tubular, cylindrical) surface of the first porous current collecting member 150. Additionally, the third porous current collecting member may be arranged along a lengthwise direction of the first porous current collecting member 150. Like the second porous current collecting member 151a, the third porous current collecting member 151b may have a plate shape. Alternatively, according to another embodiment of the present invention, as shown in FIG. 4, one surface of a third porous current collecting member 151c may be a curved surface corresponding to the curvature radius of the first porous current collecting member 150. The curved surface of the third porous current collecting member 151c is arranged to increase the contact area of the third porous current collecting member 151c with the first porous current collecting member 150, thereby improving current collection efficiency and adhesion. Still further, according to still another embodiment of the present invention, as shown in FIG. 5, two surfaces of a third porous current collecting member 151d may be curved surfaces corresponding to the shape of the outer peripheral surface of the unit cell. The curved surfaces of the third porous current collecting member 151d may be arranged to increase the contact area of the third porous current collecting member 151d with the outer surface of the unit cell when, for example, two unit cells are connected in parallel.

Similar to the first and second porous current collecting members 150 and 151a, the third porous current collecting member 151b, 151c, or 151d may be formed of a metal material including at least one selected from the group consisting of Ag, Pt, Ni, Cr, Fe, and combinations thereof.

Additionally, a third adhesive layer (not shown) may be interposed between the third porous current collecting member 151b, 151c, or 151d; and the first porous current collecting member 150. The third adhesive layer may be formed by coating a paste, that includes a binder and a metal material similar to that of the first porous current collecting member 150 or the third porous current collecting member 151b, 151c, or 151d. Other properties of the third porous current collecting member 151b, 151c, or 151d are substantially the same or similar to those of the previously described first porous current collecting member 150.

Finally, as shown in FIGS. 3 and 4, the unit cell 100 may further include a terminal portion 160 for electrically connecting the unit cell to an external component or to another terminal portion 160 in a plurality of fuel cell stacks connected in various manners. The terminal portion 160 may generally have a metal plate or bar shape so that the terminal is firmly connected. In some embodiments of the present invention, the terminal portion 160 may not be required for connections between unit cells.

Hereinafter, a method of manufacturing a solid oxide fuel cell according to an embodiment of the present invention will be described with reference to FIG. 3.

First, the paste (having the properties described previously in reference to the adhesive layers) is coated on the outer peripheral (e.g., circumferential, tubular, cylindrical) surface of the outermost electrode layer of the interconnector-type unit cell and the outer surface of the interconnector. Subsequently, the first and second porous current collecting members 150 and 151a are adhered on the coated paste according to the previously described arrangement.

Next, the binder (included in the coated paste) is evaporated by drying the coated paste. The drying temperature may be set, at least in part, according to the properties of the coated paste. For example, a typical coated paste may be dried at a temperature of about 100° C. to about 800° C. This is because the drying time of a typical coated paste increases at a drying temperature of about 100° C. or less due to the evaporation temperature of the binder of the typical coated paste being generally greater than about 100° C.; thus, the binder might not appropriately evaporate and undesirable amounts of the binder may be left in the adhesive layer after the drying of the binder if the drying temperature is less than 100° C. This is undesirable because the binder may block current collection efficiency and electrochemical reaction efficiency. On the other hand, using a temperature of more than about 800° C. may apply an unnecessary thermal impact to the components of the unit cells and the like, without any technical advantage.

Additionally, the third porous current collecting member 151b may be adhered together with the first and second porous current collecting members 150 and 151a by coating and drying the paste at the same time. Alternatively, the third porous current collecting member 151b may be adhered by coating and drying the paste after the first and second porous current collecting members 150 and 151a are completely adhered.

While the present invention has been described in connection with certain embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A solid oxide fuel cell, comprising:
   a unit cell comprising a first electrode layer, an electrolyte layer, and a second electrode layer that are sequentially laminated from an inner region to an outer region of the unit cell; and an interconnector electrically connected to the first electrode layer, extending along only a portion of a circumference of the first electrode layer, exposed to outside of the unit cell, and electrically insulated from the second electrode layer;
   a first porous current collector on an outer surface of the second electrode layer;
   a first adhesive layer interposed between the first porous current collector and the second electrode layer;
   a second porous current collector on an outer surface of the interconnector; and
   a second adhesive layer interposed between the second porous current collector and the interconnector.

2. The solid oxide fuel cell according to claim 1, wherein at least one of the first porous current collector or the second porous current collector has a mesh shape.

3. The solid oxide fuel cell according to claim 1, wherein the first porous current collector covers substantially the entire outer peripheral surface of the second electrode layer.

4. The solid oxide fuel cell according to claim 1, wherein the first adhesive layer and the second adhesive layer each comprise a metal material including at least one selected from the group consisting of silver (Ag), platinum (Pt), nickel (Ni), manganese (Mn), cesium (Ce), cobalt (Co), and combinations thereof.

5. The solid oxide fuel cell according to claim 1, wherein the first adhesive layer and the second adhesive layer each comprise a ceramic material including at least one selected from the group consisting of LCCC, LSCo, LSM, LSC, $La_2O_3$, and combinations thereof.

6. The solid oxide fuel cell according to claim 1, wherein the viscosity of the first adhesive layer and the second adhesive layer is in a range of from about 100 Pa·s. to about 300 Pa·s.

7. The solid oxide fuel cell according to claim 1, wherein the first porous current collector and the second porous current collector each comprise a metal material including at least one selected from the group consisting of silver (Ag), platinum (Pt), nickel (Ni), chromium (Cr), iron (Fe), and combinations thereof.

8. The solid oxide fuel cell according to claim 7, wherein the first porous current collector and the second porous current collector each comprise an oxidation-resistance coating layer.

9. The solid oxide fuel cell according to claim 1, wherein the first porous current collector and the second porous current collector each comprise an oxidation-resistance coating layer.

10. The solid oxide fuel cell according to claim 1, wherein the density of the first porous current collector is in a range of from about 700 kg/m$^3$ to about 3000 kg/m$^3$.

11. The solid oxide fuel cell according to claim 1, further comprising:
    a third porous current collector on an outer peripheral surface of the first porous current collector; and
    a third adhesive layer interposed between the third porous current collector and the first porous current collector.

12. The solid oxide fuel cell according to claim 11, wherein the third porous current collector has a mesh shape.

13. The solid oxide fuel cell according to claim 11, wherein the third porous current collector has a plate shape.

14. The solid oxide fuel cell according to claim 13, wherein the third porous current collector has a curved surface, the shape of the curved surface corresponding to the outer peripheral surface of the second electrode layer.

15. The solid oxide fuel cell according to claim 11, wherein the third porous current collector comprises a metal material including at least one selected from the group consisting of silver (Ag), platinum (Pt), nickel (Ni), chromium (Cr), iron (Fe), and combinations thereof.

16. The solid oxide fuel cell according to claim 15, wherein the third porous current collector comprises an oxide-resistance coating layer.

* * * * *